Aug. 26, 1969   J. F. SCHULTE   3,463,726
WASTEWATER TREATMENT METHOD
Filed Nov. 20, 1967
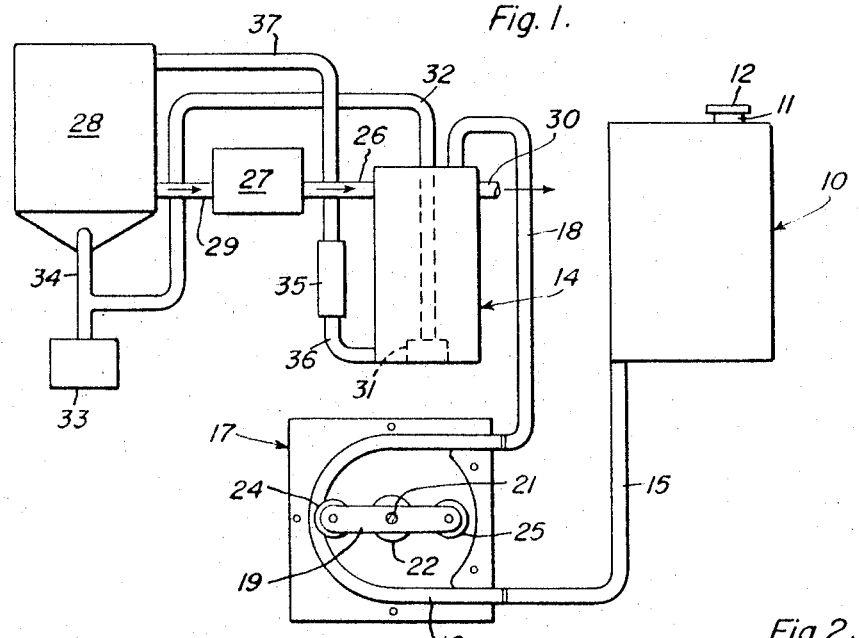
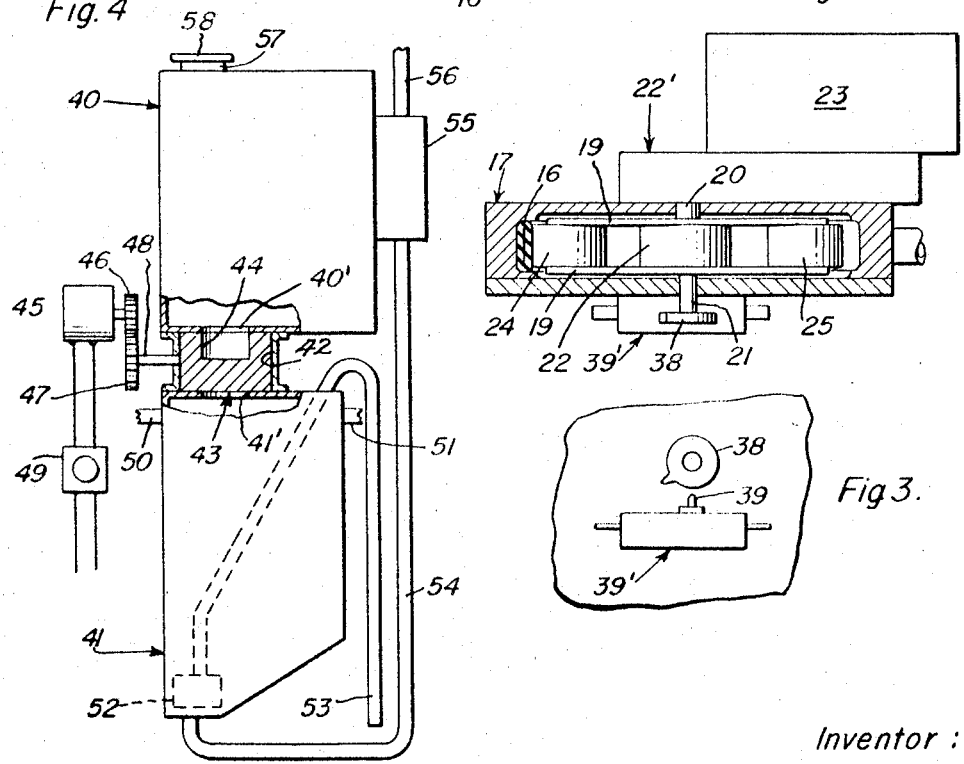
Inventor:
Johann F. Schulte,
by Thomas J. Wade
His Attorney.

United States Patent Office 3,463,726
Patented Aug. 26, 1969

3,463,726
WASTEWATER TREATMENT METHOD
Johann F. Schulte, Valley Station, Ky., assignor to General Electric Company, a corporation of New York
Filed Nov. 20, 1967, Ser. No. 684,394
Int. Cl. C02c *5/02, 1/00*
U.S. Cl. 210—8                                    3 Claims

ABSTRACT OF THE DISCLOSURE

Wastewater is treated batchwise with a dilute polyelectrolyte solution as a flocculant prepared in successive batches by mixing concentrated polyelectrolyte with solids-free supernatant carrier water obtained in the treatment of prior wastewater batches. Thus, a single vessel serves both as a mixing tank and as a storage tank for dilute polyelectrolyte solution and the necessity for a separate source of water for dilution of polyelectrolyte is eliminated.

---

This invention relates to the art of wastewater treatment and is more particularly concerned with a novel method for the batchwise treatment of wastewater with dilute polyelectrolyte solution as a flocculant.

A method including the step of adding a polyelectrolyte as a flocculant to the treating chamber of a wastewater treating unit to improve the quality of the supernatant or effluent water is disclosed and claimed in U.S. Patent 3,331,771 which issued July 18, 1967, to Kenneth S. Watson and George E. Bennett and assigned to the assignee hereof. These polyelectrolytes have a very high viscosity and are slow to dissolve. Thus, in order to utilize the polyelectrolytes in a treating chamber of a wastewater treating unit such as disclosed and claimed in U.S. Patent 3,327,855, issued June 27, 1967, in the name of Kenneth S. Watson, Robert P. Farrell, and George E. Bennett and assigned to the same assignee hereof, it is necessary to dilute the polyelectrolyte.

Dilution of the polyelectrolyte to a concentration of one to two percent results in the polyelectrolyte having a low viscosity and being more rapidly dissolved. However, when the polyelectrolyte is diluted to one to two percent, it becomes somewhat corrosive. Thus, a dilute solution of polyelectrolyte cannot be as readily stored unless special corrosion resistant materials are employed. Furthermore, when used with the wastewater treating unit of the type shown in aforesaid U.S. Patent 3,327,855 wherein it is intended for use in a home, the storage tank for the polyelectrolyte must be small. Additionally, the supply of polyelectrolyte should be sufficient to last for approximately six months so that it need only be added when other maintenance of the wastewater treating unit is required.

The present invention satisfactorily overcomes the foregoing problems by storing polyelectrolyte having a concentration of fifty percent. Thus, the storage requirements for a six months' supply when using fifty percent polyelectrolyte is approximately four gallons whereas it would be approximately two hundred gallons if one percent polyelectrolyte were stored. Furthermore, by storing the fifty percent polyelectrolyte, the corrosion problem, which is created by one percent polyelectrolyte, is eliminated.

While the storage of the polyelectrolyte with a fifty percent concentration eliminates the corrosion problem and the large storage volume, the high viscosity of the the fifty percent polyelectrolyte requires precise metering. This is accomplished by utilizing either of two different types of metering devices that precisely meter the high viscosity polyelectrolyte.

Even after the fifty percent concentrated polyelectrolyte has been metered, it still must be diluted for use in the treating chamber of a wastewater treating unit. While potable water could be added for mixing with the polyelectrolyte, the possibility of backflow into the potable water system from the wastewater treating unit would exist. The use of potable water also would add to the cost of installation and operation of the unit.

The present invention satisfactorily overcomes these problems by using the treated wastewater from the previous treatment cycle. Thus, it is only necessary to manually fill the mixing tank with potable water when the wastewater treating unit is initially installed.

Because of the high viscosity of the fifty percent concentrated polyelectrolyte and its slow dissolving characteristic, it is necessary to agitate the mixture of the fifty percent concentrated polyelectrolyte and the water. While agitation by a mechanical agitator has been previously suggested for diluting a concentrated polyelectrolyte in water, this mixing structure creates maintenance problems and added cost.

The present invention satisfactorily overcomes these problems by utilizing air to create agitation for mixing the concentrated polyelectrolyte and the water. Since the air is already required for aeration purposes in a treating chamber of wastewater treating unit of the type shown and described in aforesaid U.S. Patent 3,327,855, the present invention readily reduces the maintenance problems and cost while still obtaining the desired mixing of fifty percent concentrated polyelectrolyte with water to reduce the polyelectrolyte to one or two percent whereby it may be readily added as a flocculant to the treating chamber of the wastewater treating unit.

It is consequently a primary object of this invention to provide a method or a means by which wastewater can be treated with a diluted polyelectrolyte without the necessity either for storing diluted polyelectrolyte or for providing a separate dilution water source.

It is another object of this invention to achieve the foregoing objective without incurring any offsetting economic or operational disadvantage.

Other objects of this invention will be readily perceived from the following description, claims, and drawing.

This invention broadly described includes as key steps in the batchwise treatment of wastewater the mixing of concentrated polyelectrolyte with supernatant water from a prior treated wastewater batch and thereafter adding the resulting dilute polyelectrolyte solution to another wastewater batch undergoing treatment. More in detail, this method is preferably carried out in such a way that as separate wastewater batches are treated in succession, the dilute polyelectrolyte solution required for each batch is separately prepared using the supernatant water obtained as a consequence of the complex treatment process including polyelectrolyte treatment of the immediately preceding wastewater batch. Additionally, the dilute polyelectrolyte solution is not stored but is prepared as required and is transferred from its point of preparation directly to the point of its introduction into and mixing with its intended wastewater batch.

Apparatus implementing this new method comprises a mixing tank and means to supply a predetermined volume of treated wastewater to the mixing tank. Means connect a storage tank, which contains concentrated polyelectrolyte, to the mixing tank. The connecting means has means to meter a predetermined volume of concentrated polyelectrolyte to the mixing tank. The mixture of water and concentrated polyelectrolyte in the mixing tank is agitated by suitable means to cause dilution of the polyelectrolyte. The diluted polyelectrolyte is supplied from the mixing tank to the treating chamber of the wastewater treating unit by suitable means.

This apparatus also includes a device for feeding a diluted polyelectrolyte to a treating chamber of a wastewater treating unit from a source of concentrated polyelectrolyte. This device comprises a mixing tank and means to supply a predetermined volume of water to the mixing tank. Means connect a storage tank, which contains concentrated polyelectrolyte, to the mixing tank. The connecting means has means to meter a predetermined volume of concentrated polyelectrolyte to the mixing tank. Air is supplied to the mixing tank by suitable means whereby the mixture of water and concentrated polyelectrolyte in the mixing tank is agitated to cause dilution of the polyelectrolyte. The diluted polyelectrolyte is supplied from the mixing tank to the treating chamber of the wastewater treating unit by suitable means.

The attached drawing illustrates preferred embodiments of the invention, in which:

FIGURE 1 is a schematic elevational view of one form of the feeding and mixing device as used in conjunction with a wastewater treating unit and with a cover removed for clarity purposes;

FIGURE 2 is a sectional view, partly in plan, of a portion of the structure of FIGURE 1 with the cover aded;

FIGURE 3 is a front elevational view of a portion of the structure of FIGURE 2; and FIGURE 4 is a schematic elevational view of another form of the feeding and mixing device which can advantageously be used in carrying out the present invention.

Referring to the drawing and particularly FIGURE 1, there is shown a storage tank 10 for a concentrated polyelectrolyte. It should be understood that the polyelectrolyte is a liquid and may be any polyelectrolyte, which is suitable for use as a flocculant, such as those mentioned in aforesaid U.S. Patent 3,331,771, for example.

The storage tank 10 has an inlet pipe 11 through which the liquid polyelectrolyte is supplied. A vented cap 12 fits over the inlet pipe 11 to close the storage tank 10. The storage tank 10 has sufficient volume, which is approximately four gallons, to store a six months' supply of the polyelectrolyte of fifty percent concentration for a home wastewater treating unit of the completely self-contained automatic type.

The bottom of the storage tank 10 is connected with the top of a mixing tank 14 by suitable means. As shown in FIGURE 1, the connecting means includes a conduit 15 extending downwardly from the storage tank 10. The conduit 15 communicates with a flexible hose 16, which is disposed within a cut-out portion of a support member 17. The flexible hose 16 communicates with one end of a conduit 18, which has its other end communicating with the top of the mixing tank 14.

It should be understood that the conduits 15 and 18 and the flexible hose 16 may be formed as a single member. In such an arrangement, the member would have to be a flexible hose.

A predetermined quantity of the polyelectrolyte, which has a fifty percent concentration, is metered from the tank 10 to the mixing tank 14. The metering mechanism includes a pair of spaced arms 19 (see FIGURE 2). One of the arms 19 is carried by a shaft 20 while the other of the arms 19 is carried by a reduced portion 21 of a member 22, which is disposed between the arms 19 and fits over the shaft 20 for connection therewith.

One end of the shaft 20 extends within a gear housing 22' and has a gear (not shown) thereon for cooperation with a gear (not shown), which is driven by a motor 23. Thus, the arms 19 are mounted for rotation by the motor 23. The gear housing 22' is secured to the support member 17, and the motor 23 is attached to the gear housing 22'.

Rollers 24 and 25 are mounted on opposite ends of the spaced arms 19 and therebetween. The pivot axis of the arms 19 and their lengths are selected so that one of the rollers 24 and 25 is always in contact with the flexible hose 16 to provide precise metering of the required volume of the fifty percent concentrate of polyelectrolyte to the mixing tank 14. The contacting roller also stops flow when rotation of the arms 19 ceases due to its compressing of the flexible hose 16.

The mixing tank 14 is connected by a conduit 26 to the outlet of a filter unit 27 of a wastewater treating unit. One example of the wastewater treating unit including the filer unit is that shown and described in aforesaid U.S. Patent 3,327,855.

As set forth in aforesaid U.S. Patent 3,327,855, wastewater from a treating chamber 28 flows through a conduit 29 to the filter unit 27 during each cycle of operation. Thus, the wastewater, which flows through the conduit 26, has been treated.

The mixing tank 14 has a second conduit 30 extending therefrom at the same level as the conduit 26. The conduit 30 directs the wastewater to a storm sewer or onto the ground, for example, as mentioned in aforesaid U.S. Patent 3,327,855.

Because the conduits 26 and 30 are at the same level, a predetermined volume of treated wastewater is supplied to the mixing tank 14 after each cycle of operation of the wastewater treating unit. Thus, all of the additional wastewater beyond the predetermined volume leaves the mixing tank by the conduit 30.

Air is supplied to a diffuser 31 in the lower portion of the mixing tank 14 for agitating the mixture of concentrated polyelectrolyte and water. The air is supplied to the diffuser 31 through a conduit 32 from a compressor 33. The compressor 33 is also used to supply air to the treating chamber 28 through a conduit 34 for aerating the wastewater within the treating chamber 28.

The diluted polyelectrolyte solution is supplied from the mixing tank 14 to the treating chamber 28 by a positive displacement pump 35. A conduit 36 connects the bottom of the mixing tank 14 with the inlet of the positive displacement pump 35. A conduit 37 connects the outlet of the pump 35 to the upper portion of the treating chamber 28 above the normal maximum liquid level whereby the flocculant is introduced into the treating chamber 28 to aid and improve settling in the treating chamber 28. It should be understood that a check valve (not shown) is employed between the outlet of the pump 35 and the treating chamber 28 to prevent backflow.

Considering the operation of the embodiment of FIGURES 1 to 3, the mixing tank 14 is manually filled with fresh water only once when initial operation of the wastewater treating unit occurs. Thereafter, wastewater from the filter unit 27 is employed and automatically provided.

With the mixing tank 14 filled with water, a timer (not shown) starts operation of the motor 23 through momentary closing of a switch (not shown). A cam 38 (see FIGURES 2 and 3) on the reduced portion 21 of the member 22 permits the motor 23 to operate for a predetermined time, equivalent to one revolution of the member 22, whereby a predetermined quantity of the fifty percent concentrated polyelectrolyte within the storage tank 10 is pumped therefrom to the mixing tank 14 by the rollers 24 and 25 on the rotating arms 19 cooperating with the flexible hose 16. The cam 38 cooperates with a plunger 39 (see FIGURE 3) of a switch 39', which is mounted on the support member 17, to stop operation of the motor 23 after one revolution of the cam 38 and the member 22. The quantity metered is a function of the inside diameter and radius of curvature of the hose 16.

It should be understood that the switch 39' is opened when the plunger 39 is moved inwardly by the cam 38. The switch 39' is connected in parallel with the momentarily closed switch, which is energized by the timer, so that the switch 39' controls operation of the motor 23 as soon as the cam 38 ceases to push the plunger 39 inwardly.

It should be understood that the timer is energized when a treating cycle of the wastewater within the treating chamber 28 begins. This is when raw sewage is no longer permitted to flow into the treating chamber 28 as more specifically described in U.S. Patent 3,327,855.

As the fifty perecent concentrated polyelectrolyte is pumped into the mixing tank 14, it is mixed with the water therein due to the air from the compressor 33 being supplied through the air diffuser 31. This agitation of the mixture within the mixing tank 14 by the air flowing through the air diffuser 31 results in the polyelectrolyte being diluted to one or two percent so that it has a low viscosity. It should be understood that the compressor 33 operates until mixing of the polyelectrolyte with the water in the mixing tank 14 is completed. Thus, the program timer for the wastewater treating unit must be designed to allow this extra time before it stops operation of the compressor 33.

It has been determined that the dilution of approximately thirty to forty milliliters of fifty percent concentrated polyelectrolyte with water sufficient to reduce it to a one or two percent concentration requires approximately three minutes. After at least this period of time has elapsed, a timer (not shown) energizes the positive displacement pump 35 to pump the diluted polyelectrolyte into the treating chamber 28 through the conduit 37. Since the pump 35 will pump the entire contents of the mixing tank 14 in approximately one minute, the timer is designed so that it cuts off the pump 35 after a predetermined time in which all of the diluted polyelectrolyte will be removed from the mixing tank 14.

Thereafter, the wastewater treating unit operates as described in U.S. Patent 3,327,855. After the effluent water leaves the filter unit 27, it flows through the conduit 26 into the mixing tank 14. Since the mixing tank 14 has a second conduit 30 therein to allow flow therethrough, only the required volume of treated wastewater is captured within the mixing tank 14. The remainder of the treated wastewater flows to a storm sewer or onto the ground, for example, through the conduit 30. Thus, the feeding device of the present invention is ready for another cycle.

Of course, the timer for causing operation of the motor 23 could be energized near the end of a treating cycle, if desired, rather than when a treating cycle begins. In this arrangement, the concentrated polyelectrolyte would be supplied to the mixing tank 14 after the mixing tank 14 has been filled with effluent water. Additionally, the compressor 33 would have to again be energized to agitate the mixture within the mixing tank. This arrangement would allow a longer period (typically several hours) for the concentrated polyelectrolyte and the effluent water to mix. The diluted solution would not deteriorate or cause corrosion during this time period.

Referring to FIGURE 4, storage tank 40 is disposed above a mixing tank 41 and is connected thereto by a conduit 42. A rotatably mounted cylinder 43 is disposed within the conduit 42 to control the flow of concentrated polyelectrolyte from the storage tank 40 to the mixing tank 41. The cylinder 43 is solid except for a recess 44 formed therein to receive a predetermined volume of the concentrated polyelectrolyte from the storage tank 40 through an opening 40' in the bottom thereof when the cylinder 43 is positioned as shown in FIGURE 4.

The cylinder 43 is rotated by a motor 45. The motor 45 has a gear 46 meshing with a gear 47 on a shaft 48, which is connected to the cylinder 43. Thus, the gears 46 and 47 form a gear reducer to cause rotation of the cylinder 43 by the motor 45 at the desired speed.

When the motor 45 is energized through a timer 49, the cylinder 43 is rotated 180° so that the recess 44 communicates only with the mixing tank 41 through an opening 41' in the top thereof. When this occurs, the concentrated polyelectrolyte within the recess 44 drains therefrom to the mixing tank 41. The timer 49 is actuated to permit energization of the motor 45 when addition of the concentrated polyelectrolyte to the water within the mixing tank 41 is desired. This occurs as soon as treating of the wastewater in the wastewater treating unit begins.

Of course, the timer 49 could be actuated near the end of the treating cycle, if desired, as mentioned with respect to the embodiment of FIGURES 1 to 3.

The mixing tank 41 is connected by a conduit 50 to the filter unit 27 in the same manner as the conduit 26. Likewise, a second conduit 51 is disposed at the same level as the conduit 50 for allowing the treated wastewater to flow to a storm sewer or onto the ground, for example, in the same manner as the conduit 30.

Air is supplied to an air diffuser 52 at the bottom of the mixing tank 41 by a conduit 53. The conduit 53 communicates with the air compressor 33 in the same manner as the conduit 32. As mentioned with respect to the embodiment of FIGURES 1 to 3, the air compressor 33 must operate for a sufficient time to permit mixing of the concentrated polyelectrolyte and the treated wastewater within the mixing tank 41.

The diluted polyelectrolyte within the mixing tank 41 is transported to the treating chamber 28 by a conduit 54, a pump 55, and a conduit 56 in the same manner as described for the pump 35 and the conduits 36 and 37 of the modification of FIGURES 1 to 3. The conduit 54 is connected to the bottom of the mixing tank 41 in the same manner as the conduit 36. A check valve (not shown) is employed in the same manner as with the pump 35.

It should be understood that the storage tank 40 has an inlet pipe 57 through which the liquid polyelectrolyte is supplied. A vented cap 58 fits over the inlet pipe 57 to close the storage tank 40.

Considering the operation of the embodiment of FIGURE 4, the timer 49 is energized to actuate the motor 45 to rotate the cylinder 43 to allow the concentrated polyelectrolyte to flow from the recess 44 into the mixing tank 41 through the opening 41'. Air is supplied through the air diffuser 52 to agitate the mixture of the concentrated polyelectrolyte and the wastewater within the mixing tank 41. It should be understood that the mixing tank 41 requires a supply of water from an outside source only once when the wastewater treating unit is initially installed in the same manner as described for the mixing tank 14 of FIGURES 1 to 3.

The timer 49 allows the motor 45 to run only long enough to rotate the cylinder approximately 180°. It then stops the motor 45 whereby the cylinder 43 remains with the recess 44 extending downwardly and in communication with the mixing tank 41 through the opening 41'.

After the concentrated polyelectrolyte solution has been mixed with the water within the mixing tank 41 for a predetermined period of time (this is approximately three minutes for a solution containing approximately thirty to forty milliliters of fifty percent concentrated polyelectrolyte and sufficient water to dilute this to one percent concentration), the supply of air is stopped due to the program timer of the wastewater treating unit stopping operation of the compressor 33. It should be understood that the program timer of the wastewater treating unit of U.S. Patent 3,327,855 would have to be modified to permit the compressor to run for this extra length of time after flow of sewage into the treating chamber is stopped.

A timer (not shown) energizes the pump 55 after flow of air to the air diffuser 52 is stopped. The size of the pump 55 is such that it requires only approximately one minute to pump the volume of diluted polyelectrolyte in the mixing tank 41 to the treating chamber 28. After this predetermined operating time, the timer stops the pump 55.

The timer 49 then permits energization of the motor 45 again to rotate the cylinder 43 180°. As a result, the recess 44 is again in communication with the storage tank 40 and the cylinder 43 prevents communication between the storage tank 40 and the mixing tank 41. The timer 49 stops rotation of the motor 45 as soon as the cylinder 43 has rotated the required 180°. It should be understood that suitable seal means may be employed with the cylinder 43 in cooperation with the conduit 42 to prevent any leakage from the storage tank 40 to the mixing tank 41.

When the effluent water leaves the filter unit 27, it flows through the conduit 50 into the mixing tank 41. After the mixing tank 41 is filled, all of the treated wastewater from the filter unit 27 flows through the conduit 51 to a storm sewer or onto the ground, for example. Thus, the mixing tank 41 is again ready for the next cycle when the wastewater treating unit is again operating to treat the wastewater.

An advantage of this invention is that the storage space for a polyelectrolyte to be used as a flocculant in a wastewater treating unit is relatively small. Another advantage of this invention is that cost of construction, installation, and operation is reduced since treated wastewater is utilized for diluting the concentrated poly-electrolyte. A further advantage of this invention is that the corrosive effect of diluted polyelectrolyte is eliminated. Still another advantage of this invention is that maintenance problems are reduced by using air rather than a mechanical agitator for mixing the concentrated polyelectrolyte with the water. A still further advantage of this invention is that only a single air supply is required for both aeration of the wastewater within the treating chamber and for agitation purposes in the mixing tank.

Although the present invention has been described in connection with preferred embodiments, it is to be understood that modifications and variations may be resorted to without departing from the spirit and scope of the invention, as those skilled in the art will readily understand. Such modifications and variations are considered to be within the purview and scope of the invention and the appended claims.

What I claim as new and desire to secure by Letters Patent of the United States is:

1. The batchwise method of wastewater treatment which comprises the steps of mixing concentrated polyelectrolyte with fresh water in a mixing tank to produce a first dilute polyelectrolyte batch solution, transferring substantially all the first dilute polyelectrolyte batch solution to a wastewater treating chamber, mixing the dilute polyelectrolyte batch solution with a first untreated wastewater batch in the treating chamber, settling the resulting treated wastewater mixture, discharging the resulting supernatant treated wastewater from the treating chamber through the mixing tank and into a sewer and thereby filling the mixing tank with treated wastewater, delivering a predetermined amount of concentrated polyelectrolyte into the treated wastewater in the mixing tank to provide a second dilute polyelectrolyte batch solution, transferring substantially all the second dilute polyelectrolyte solution to the wastewater treating chamber, mixing the said second dilute solution with a second untreated wastewater batch in the treating chamber, and continuing and repeating the cycle.

2. The method of claim 1 including the additional step of filtering the treated wastewater before introducing it into the mixing tank.

3. The method of claim 1 in which concentrated polyelectrolyte is of about 50 percent strength and in which the dilute polyelectrolyte batch solutions prepared in the mixing tank contain between about one percent and two percent polyelectrolyte.

References Cited

UNITED STATES PATENTS

| | | | |
|---|---|---|---|
| 830,552 | 9/1906 | Zeigler | 210—199 |
| 989,942 | 4/1911 | Bain | 137—101.31 |
| 1,799,444 | 4/1931 | Sperr | 210—7 |
| 2,074,082 | 3/1937 | Domogalla | 210—46 X |
| 2,565,321 | 8/1951 | Peterson | 210—206 |
| 2,603,597 | 7/1952 | Daily | 210—46 |
| 2,692,229 | 10/1954 | Heise et al. | 210—60 X |
| 3,331,771 | 7/1967 | Watson et al. | 210—18 X |

MICHAEL E. ROGERS, Primary Examiner

U.S. Cl. X.R.

210—18, 54, 60, 196